Patented Aug. 18, 1931

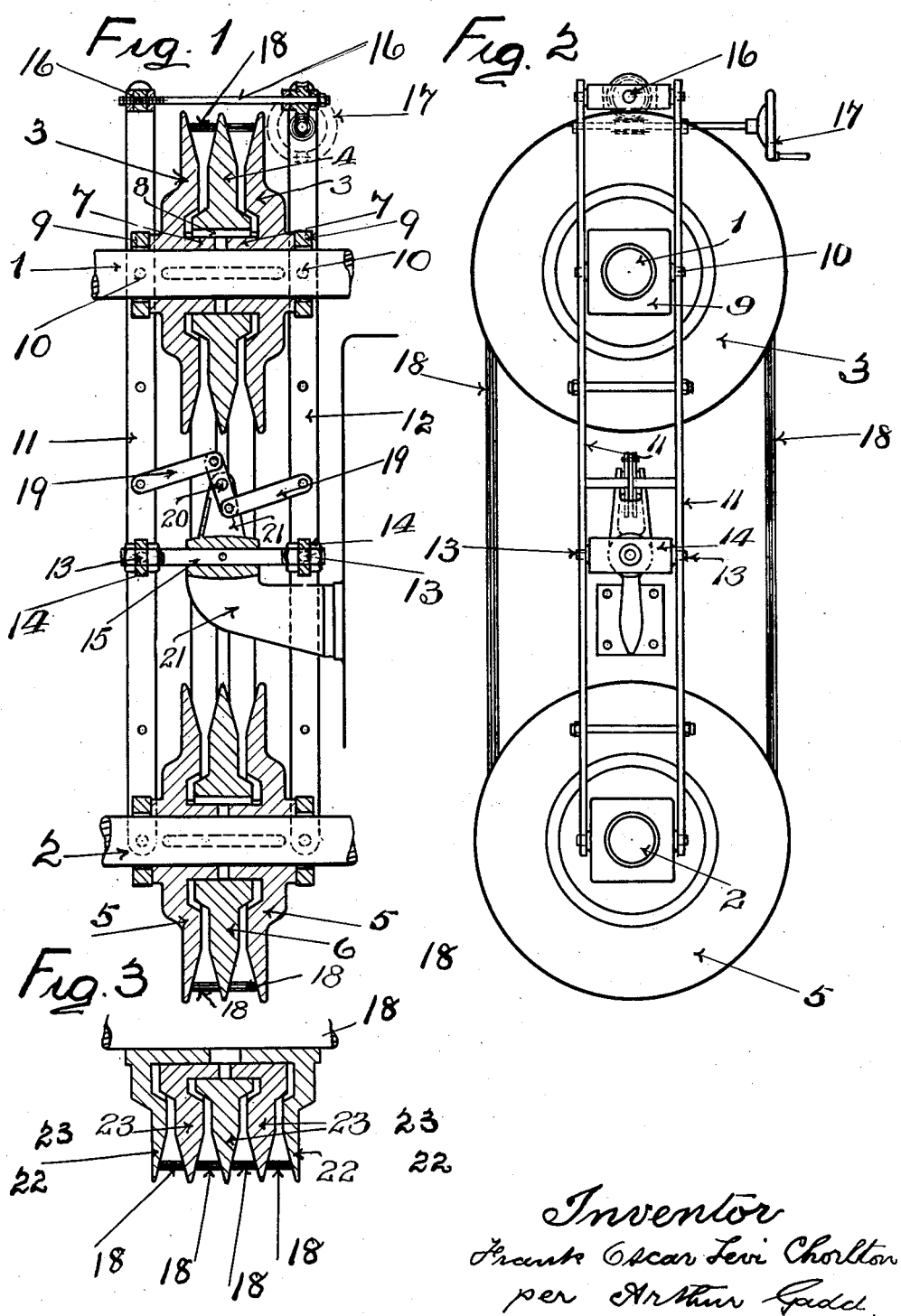

1,819,227

UNITED STATES PATENT OFFICE

FRANK OSCAR LEVI CHORLTON, OF BURY, ENGLAND

EXPANSIBLE V-PULLEY DRIVE

Application filed April 17, 1930, Serial No. 445,099, and in Great Britain March 26, 1930.

The invention relates to variable-speed belt and rope drives of the expansible V type, and has for object the provision of grooves for the pulleys thereof in multiple form and in a manner for counteracting the common effects of tilting moments produced about base portions of the parts involved, and with which improvements automatic equalization of tension between the belts or the like in the several grooves is attained.

According to my invention, the V grooves of each driving pulley are formed by separable and movable members or flanges, such as two side ones and a central one in the space between them, the bosses of the side members being inwardly extended to allow of that of the central member being slidably mounted thereon, but capable of moving round therewith.

Means for varying the distances apart of the members referred to, and for changing the gear ratio between an improved pulley on one shaft and an improved pulley on another and parallel shaft are described herein.

In the examples according to my invention illustrated in the drawings, a pair of parallel shafts are shown in belt connection with each other by means of pulleys for each of which the grooves are provided in multiple form. Fig. 1 is a sectional elevation of one such arrangement and Fig. 2 is a view at right angles thereto. Fig 3 shows a modification of a part of Fig. 1. The two parallel shafts are indicated at 1 and 2 respectively, and the pulley for shaft 1 comprises movable side members or flanges 3 and a central member 4. The shaft 2 carries a pulley similarly provided at 5 and 6 respectively, and the herein description with reference to parts about shaft 1 is to be taken as being applicable in substance to similar parts about shaft 2.

The bosses of the members 3 are shown provided with inward extensions 7 upon which is slidably mounted the central member 4 and capable of turning with said parts 3 by being connected to the extensions 7 such as by a feather at 8 on member 4 working in a groove corresponding therewith in each of the extensions named.

The outer bosses of members 3 abut against plates or rings 9 adjacent to shaft 1. These rings are shown pivoted at 10 to levers 11 and 12 in double-bar form which levers are centrally pivoted at 13 to bearings 14 connected together by a shaft 15 carried in a bracket 21; said shaft is provided with screw-threads and nuts for adjustment of the tension of the belting as will be obvious. If ball thrust bearings were used between the plates 9 and the parts concerned, the thrusts would be better met.

The levers 11 and 12 are moved about the pivot 13 by a screw-threaded rod indicated at 16 engaging the same, and revoluble by the operation of a hand wheel 17 in worm and wheel connection with said rod 16. The provision of swivel-like bearings are here advantageous. It will thus be seen that the movement in opposite directions of the levers mentioned about the pivot 13 will result in the grooves between the members 3 and 4 being either widened or reduced as the case may be, and the corresponding grooves between the members 5 and 6 being alternatively reduced or widened. In this way the gear ratio may be changed without interference with the tension existing in the belting employed. It will be obvious that said tension will operate to force apart the members on release of resistance by the side rings 9.

It will also be seen that on account of the clearance between the bosses of the various members forming the pulley grooves, that the relative tensions of the pairs of belts 18 employed becomes automatically equalized by the central member of each pulley slidably adjusting itself in position laterally according to the difference in side pressures of the belting to be so equalized.

In Fig. 1 the pressing of member 4 upon extensions 7 assists in counteracting the outward tilting action upon the outer members 3.

It will be seen that by mounting the outer members, such as 3 on inwardly extending bosses or parts of further outer members provided, the number of grooves per pulley may be increased accordingly.

In Fig. 3 three inner members 23 are shown riding on or supported by the extended bosses of outer members 22, thus illustrating one method of providing a number of laterally movable inner members slidably mounted on inwardly extended bosses of laterally movable outer members.

I claim:—

1. In a multiple-grooved pulley of the expansible V type, for variable-speed drives, laterally movable inner flanges in a space between laterally movable outer flanges, grooves for driving purposes formed between said flanges, inwardly extended bosses on the outer flanges, said inner flanges slidably mounted on said extended bosses, but revoluble therewith, and said outer flanges slidably mounted on a shaft of the drive, but revoluble therewith, whereby the distances apart of the flanges may be mechanically controlled, and the tension of the driving means in a variable speed drive may be automatically equalized, as herein set forth.

2. In a double-grooved pulley of the expansible V type, for variable-speed drives, a laterally movable inner flange in a space between laterally movable outer flanges, grooves for driving purposes formed between said flanges, inwardly extended bosses on the outer flanges, said inner flange slidably mounted on said extended bosses, but revoluble therewith, and said outer flanges slidably mounted on a shaft of the drive, but revoluble therewith, mechanical means for varying the distances between the flanges comprising centrally pivoted levers on a support, in pivotal-bearing connection with a pair of parallel shafts involved in the drive, said bearings abutting against the external bosses of the movable outer flanges herein named, and a worm-wheel operated shaft in screw-thread connection with an extremity of said pivoted levers, for altering the gear ratio between pulleys of the kind described on the shafts referred to, and connected together by driving means within the grooves of said pulleys, said inner flange free to slide between the outer flanges for automatically equalizing the tensions between said driving means, as herein set forth.

FRANK OSCAR LEVI CHORLTON.